Sept. 14, 1954  P. J. DEWYER  2,689,056
MACHINE FOR SERVING AND APPLYING TAPE LABELS
Filed Dec. 12, 1951  8 Sheets-Sheet 5

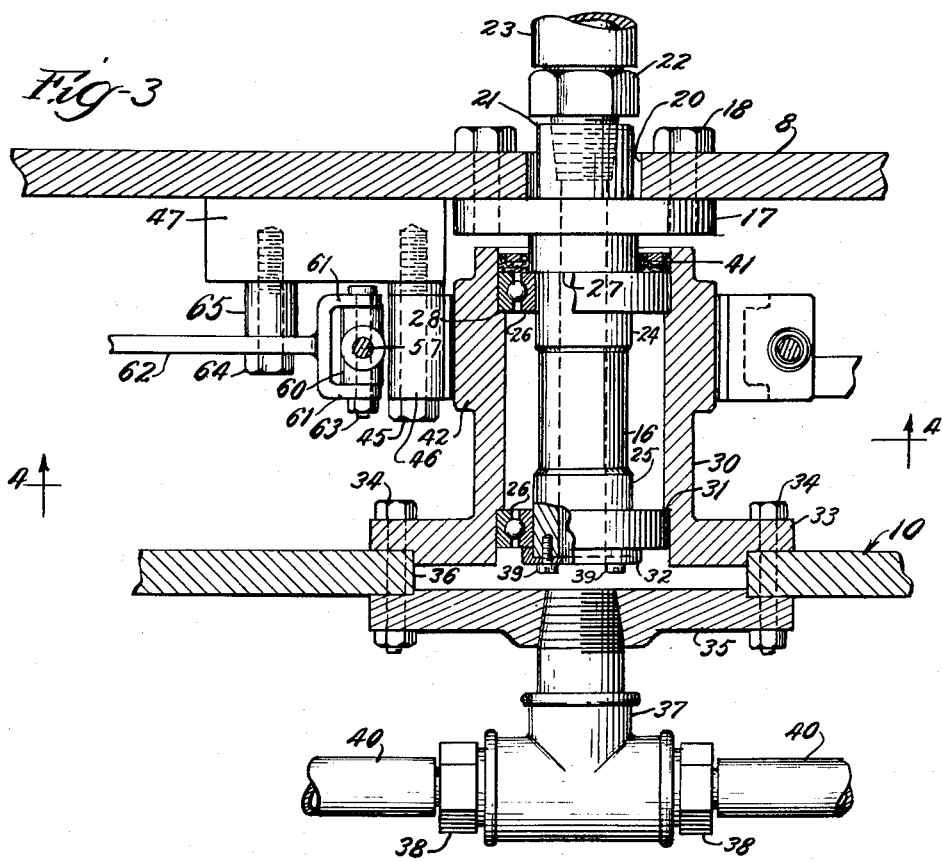
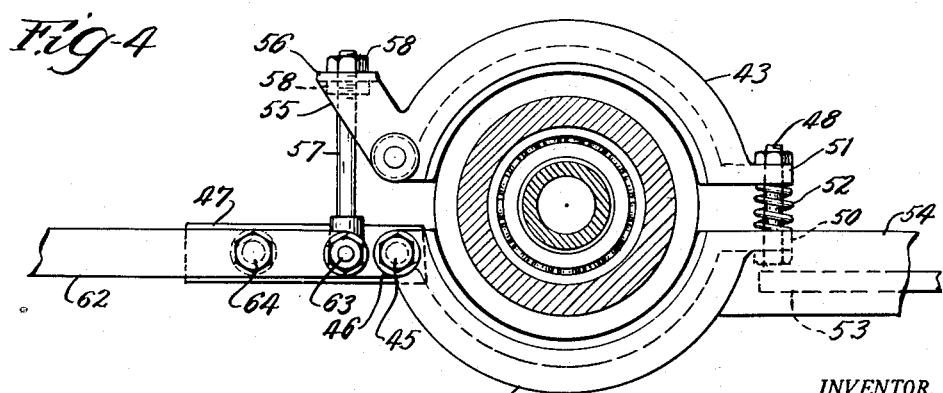

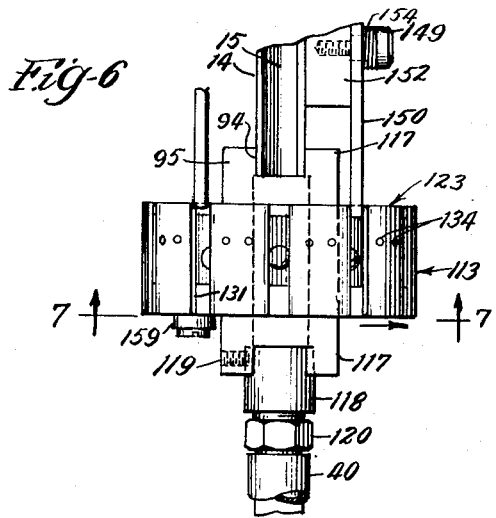
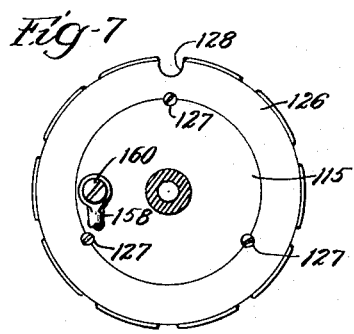
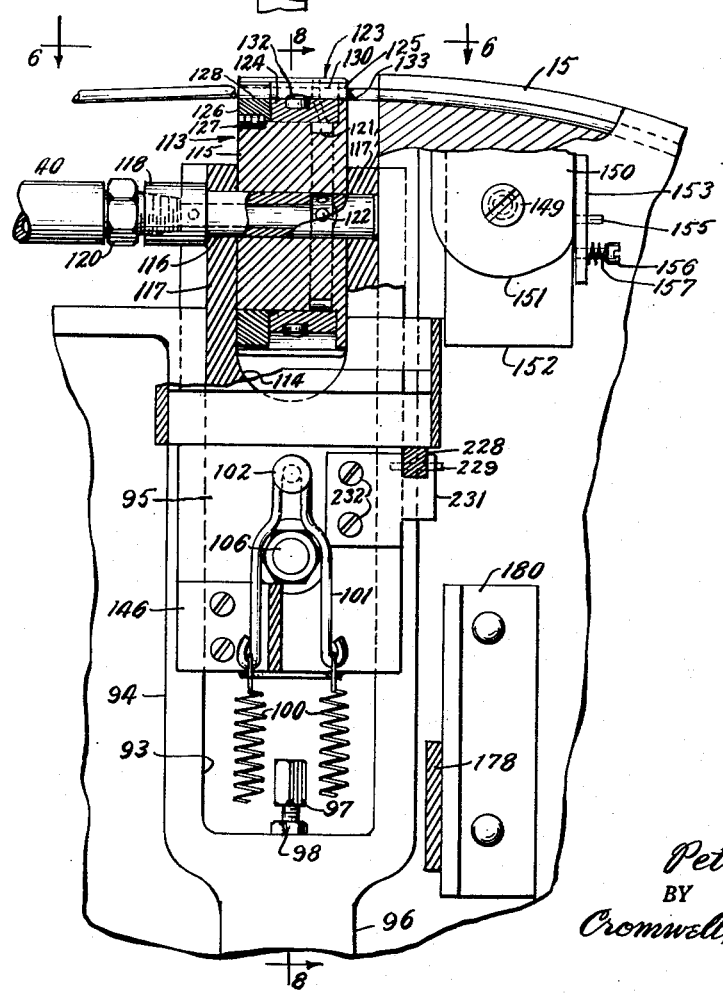

INVENTOR.
Peter J. Dewyer
BY
Cromwell, Greist & Warden
Attys

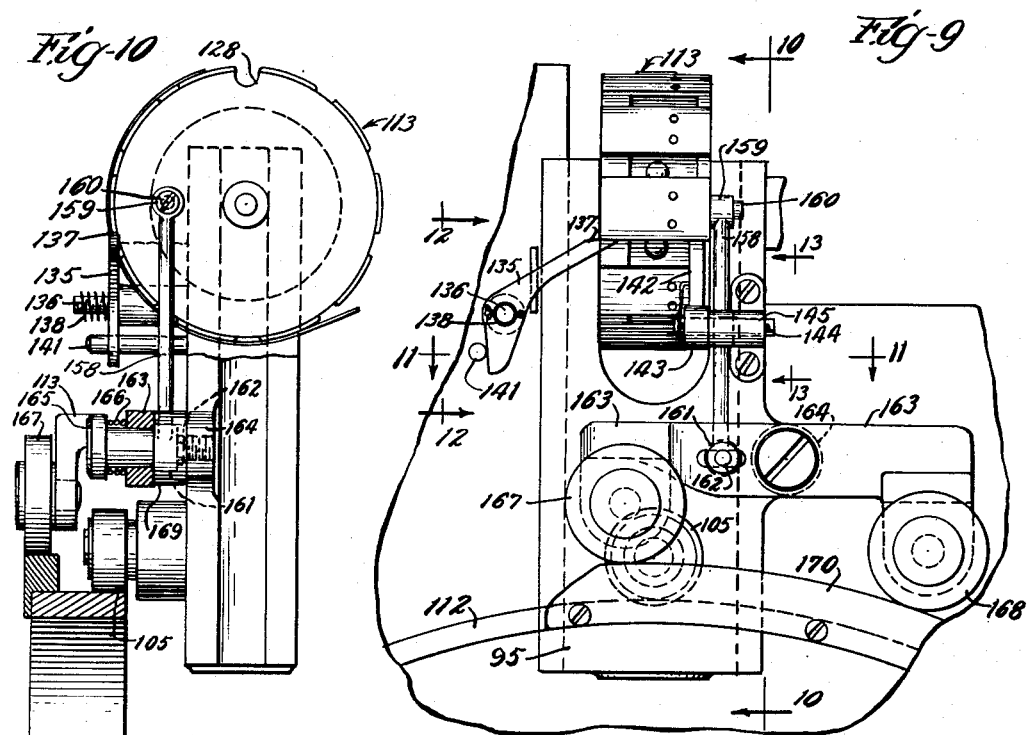
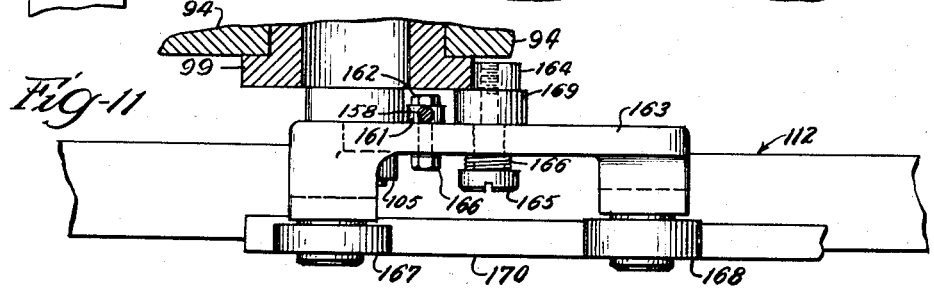
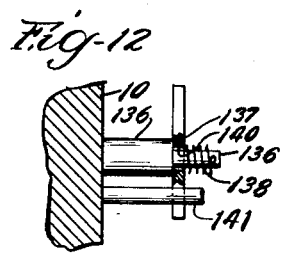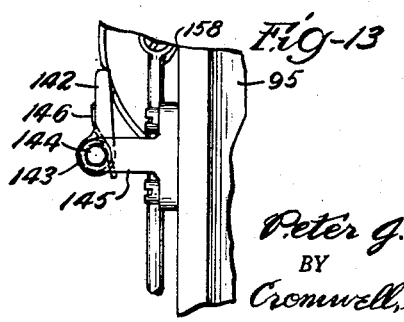

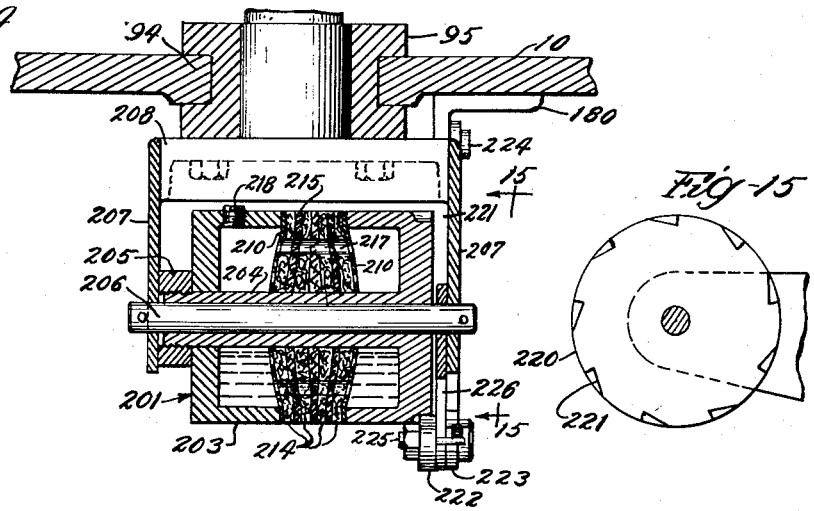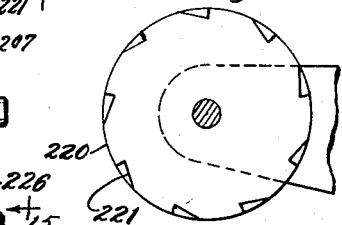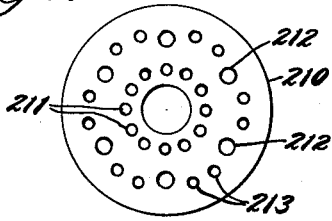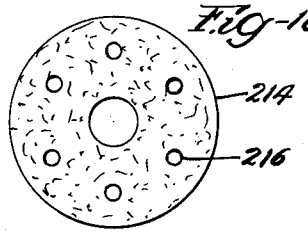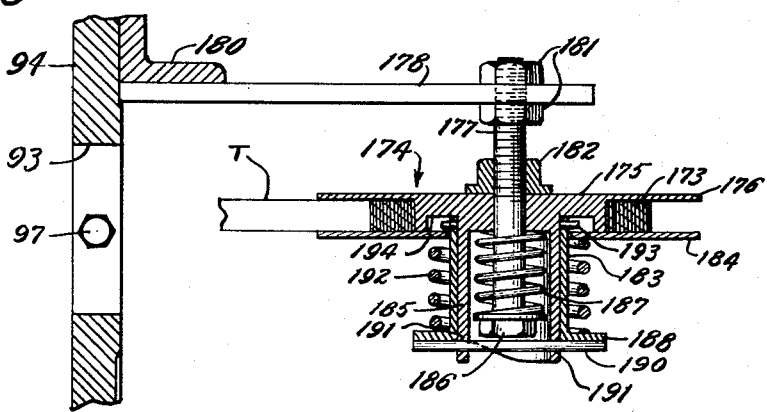

Sept. 14, 1954 P. J. DEWYER 2,689,056
MACHINE FOR SERVING AND APPLYING TAPE LABELS
Filed Dec. 12, 1951 8 Sheets-Sheet 8
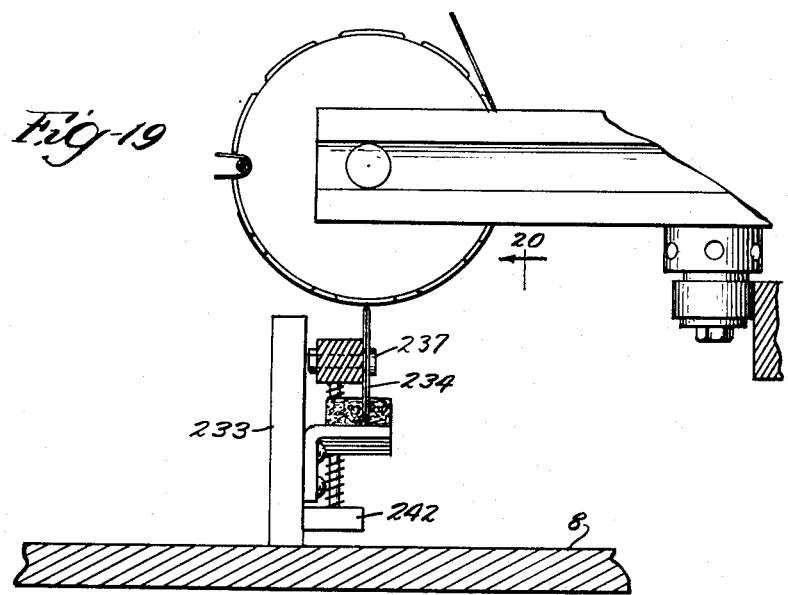
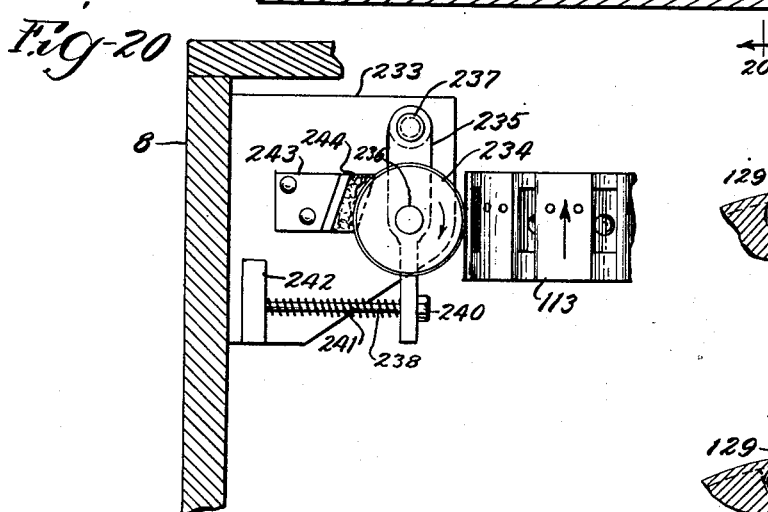
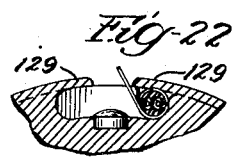
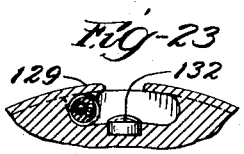
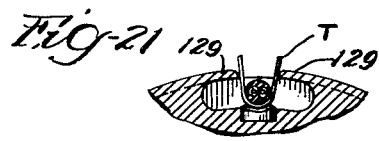
INVENTOR.
Peter J. Dewyer
BY
Cromwell, Greist & Warden Patented Sept. 14, 1954

2,689,056

UNITED STATES PATENT OFFICE 2,689,056

MACHINE FOR SERVING AND APPLYING TAPE LABELS

Peter J. Dewyer, Libertyville, Ill.

Application December 12, 1951, Serial No. 261,353

23 Claims. (Cl. 216—21)

This invention relates to a new and improved machine for automatically serving, applying and wrapping tape labels to and around an elongated object passing therethrough such, for example, as an insulated electrical conductor, a rope, a wire, a cable, a hose, etc. My present invention involves certain innovations and improvements over previous machines constructed for the same general purpose.

The machines of the present invention are particularly suited to apply tape labels to rubber insulated electrical conductors. A commercial use of the machine is for the application of so-called "Underwriters' Laboratories" labels to rubber insulated electrical cords and conductors. However, the same machine, adjusted or not as required, or another machine built on the same principle, may be used for applying tape labels to other elongated objects such as ropes, cables, clotheslines, rubber hose and tubing, and in fact to any similar object which may be coiled or reeled. While such objects usually are circular in cross-section, they may have other cross-sectional shapes, such as: triangular, square or oval.

The tape labels that may be applied by the machines of this invention may be any one of the pressure-sensitive adhesive, water-activated, or heat-activated, types. These are three commercial types of tape now available and which are commonly printed with labels of repeated design.

One important object of the invention is a new and improved labeling or tape applicating machine of the class described which includes a wheel of relatively large diameter over which the object to be labeled or taped is run so as to be supported on the periphery thereof, and which includes one or more tape or label serving and applicating units which operate automatically as the large wheel is revolved to withdraw a label or predetermined length of tape from a supply roll, sever the label or piece of tape of predetermined length from the end of the tape, apply the severed label or piece of tape to the elongated object passing through the machine, and wrap the opposite ends of the label or piece of tape on or around the object.

A further object of the invention is a tape applicating or labeling machine of the class described including a support wheel for the object to be taped or labeled which is of relatively large diameter and supports one or more tape serving and applicating units, with the machine being operated by pulling the object to be taped, such as an insulated electrical conductor, through the machine and which wheel is automatically braked to a standstill whenever there is an interruption or appreciable slackening in the tension on the object being drawn through the machine.

Another important object of the invention is a novel rotatable tape holder and wrapper to which a vacuum is applied and which is adapted to rotate in increments and operates to withdraw predetermined lengths of tape from a supply roll, sever the lengths from the end of the tape in cooperation with a cutting device, apply the severed lengths to the elongated object or article to be labeled and wrap the free ends of each severed piece around the article, this series of operations being performed cyclically.

A further object of the invention is a new and improved method of applying tape labels from a supply roll onto an elongated article such as an insulated electrical conductor wherein labels are successively severed from the end of the tape and the middle portion of each label is brought into alignment with the proper portion of the elongated article with the sticky side theretowards, supporting the label on opposite ends but not at the middle portion, bringing the label supported in this manner and the article together so that the unsupported middle portion of the label engages the article and results in the label ends being pulled off their supports, and wrapping the unsupported label ends around the article while pressing the middle portion against the article. In this method it is preferred to use suction in releasably supporting the label ends.

In addition to the foregoing objects there are certain other and additional objects which will, in part, be obvious and will, in part, appear hereinafter and be comprehended in the appended claims.

For a more complete understanding of the nature and scope of the invention, reference may now be had to the following detailed description of one embodiment thereof taken in connection with the accompanying drawings, wherein:

Fig. 3 is a fragmentary sectional detail view on enlarged scale, taken on line 3—3 of Fig. 1, certain parts being broken away and certain parts being shown in plan;

Fig. 4 is a vertical sectional view taken on line 4—4 of Fig. 3;

Fig. 5 is a fragmentary side elevational view on enlarged scale, partly in vertical section with certain parts being broken away and other parts being removed, showing one of the tape serving and applicating units as viewed in Fig. 1;

Fig. 6 is a fragmentary top plan view taken on line 6—6 of Fig. 5;

Fig. 7 is a side elevational view of the rotatable tape holder and wrapper taken on line 7—7 of Fig. 6;

Fig. 9 is a fragmentary elevational view on enlarged scale showing one of the tape serving and applicator units as viewed in Fig. 2;

Fig. 10 is a sectional view taken generally on line 10—10 of Fig. 9;

Fig. 11 is a sectional view taken on line 11—11 of Fig. 9;

Fig. 12 is a detail view taken on line 12—12 of Fig. 9;

Fig. 13 is a detail view taken on line 13—13 of Fig. 9;

Fig. 14 is a horizontal sectional view taken on line 14—14 of Fig. 8;

Fig. 15 is a detail side elevational view, certain parts being removed, taken on line 15—15 of Fig. 14;

Fig. 16 is a side elevational view of a disk element;

Fig. 17 is a side elevational view of another disk element;

Fig. 18 is a detail sectional view taken on line 18—18 of Fig. 8;

Fig. 19 is an enlarged fragmentary view taken on line 19—19 of Fig. 2 showing the details of a tape cutting roller and one of the rotatable tape holders and wrappers as it passes the cutting roller;

Fig. 20 is a detail view taken on line 20—20 of Fig. 19; and

Figs. 21, 22 and 23 are fragmentary diagrammatic views illustrating the manner in which the rotatable tape holders and wrappers operate.

Figure 1:
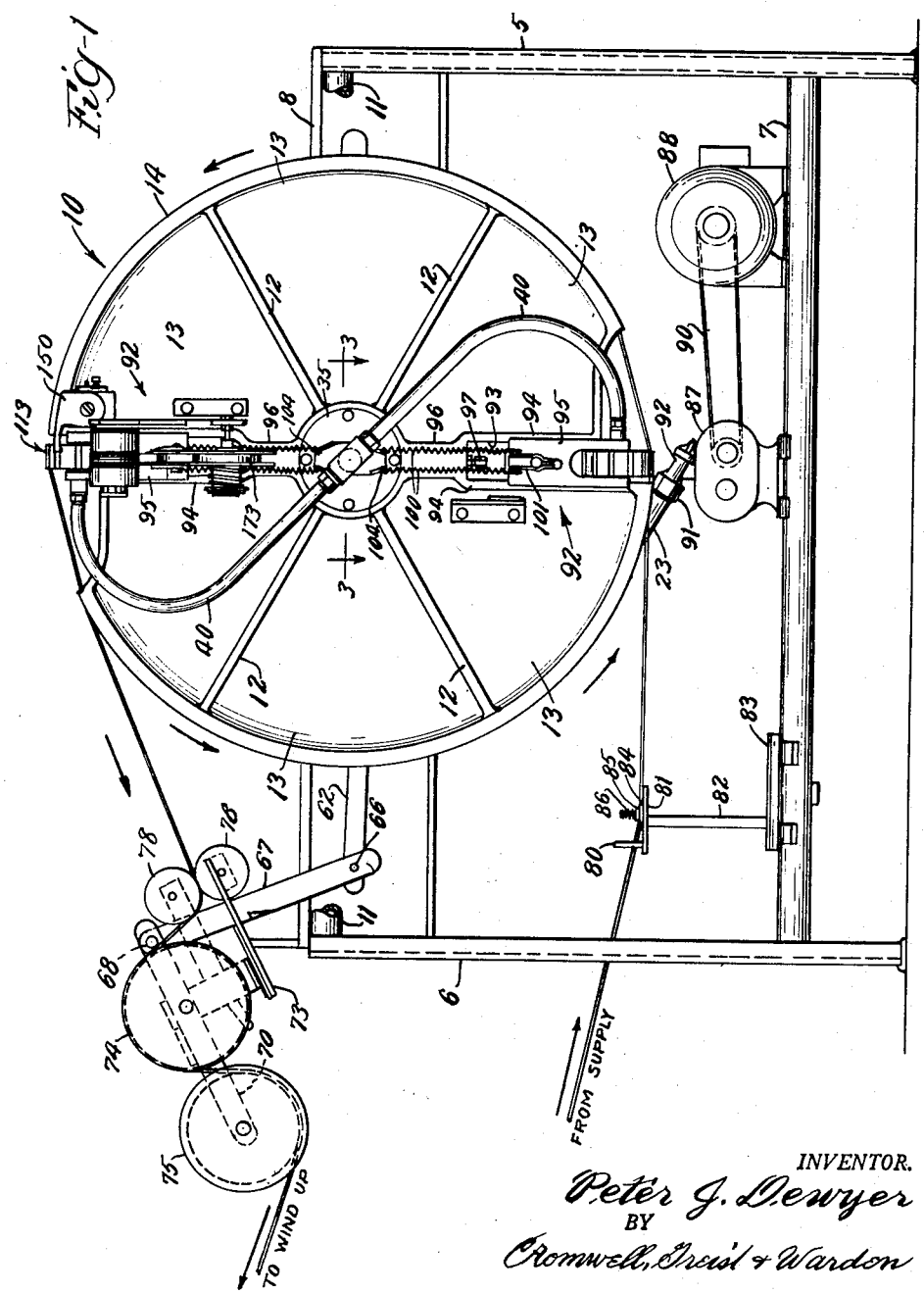
Fig. 1 is a side elevational view of a machine constructed in accordance with the principles of the invention for labeling insulated electrical conductor cord.
Figure 2:
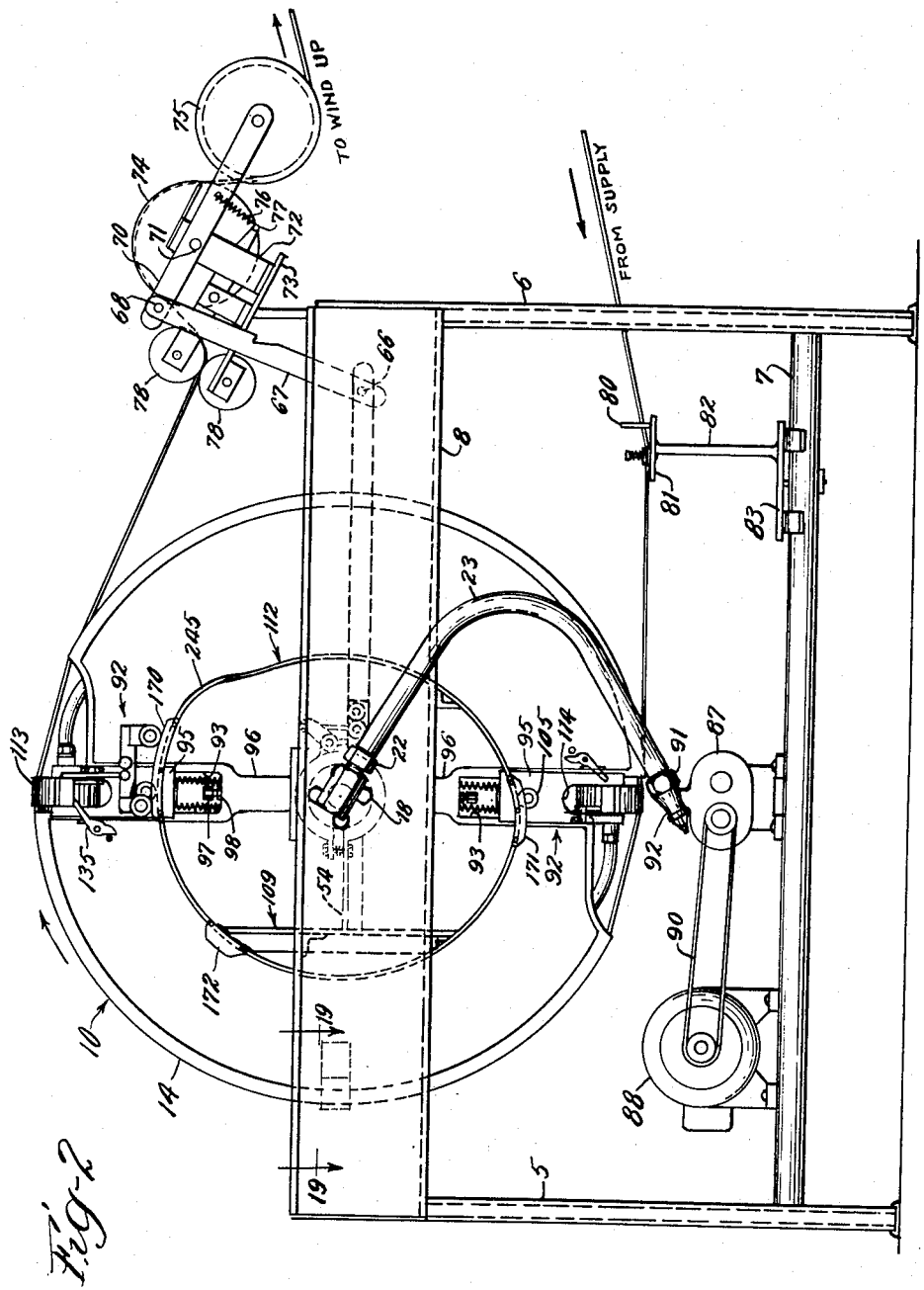
Fig. 2 is a side elevational view of the opposite side of the machine shown in Fig. 1.

Referring initially to Figs. 1 and 2 of the drawings, the frame of the machine includes a pair of end castings 5 and 6 having integrally formed feet and the pair being interconnected adjacent the bottom of the machine by a horizontal platform 7. At the top of the frame along one side a rather heavy channel member 8 extends between the upper ends of the castings 5 and 6, this channel member serving as the support for a wheel 10 of relatively large diameter which carries the tape serving and applicating units and associated operating structure. In addition, a guard rail 11 (Fig. 1) extends between the upper ends of the castings 5 and 6 on the opposite side of the wheel 10 from the channel 8. This guard rail 11, which may be in the form of a length of pipe, may be omitted where it is not required for safety.

The wheel 10 may be in the form of an aluminum casting having integrally formed bracing spokes 12—12 on one side with the sectors between the spokes 12 being filled by integral webs 13—13. The wheel 10 has an integrally formed rim 14 which is grooved as indicated at 15 in Figs. 5 and 6 for receiving and guiding an insulated electrical conductor or other similar object which is to be labeled or taped.

The wheel 10 has a hollow hub structure whereby a vacuum or suction may be transmitted from one side of the wheel to the other side through the hub. This hub structure is shown in detail in Fig. 3. The wheel or disk 10 is supported from the channel beam 8 by means of a stub shaft 16 which has a flange or plate 17 integrally formed therewith so that it may be bolted on the inside of the beam 8 as shown in Fig. 3. A plurality of stud bolts 18—18 arranged around an opening 20 in the channel 8 serves to secure the flange 17 and the stub shaft 16 in place. The stub shaft 16 is hollow as indicated by the broken line in Fig. 3 and has a nipple 21 integrally formed therewith which projects through the opening 20. An adapter 22 attached to one end of a flexible hose 23 is screwed into this nipple 21 so as to form an airtight connection therewith.

The stub shaft 16 is machined so as to have sections 24 and 25 which carry the inner races of a pair of ball bearings 26—26. One of the ball bearings 26 is retained in place between a shoulder 27 formed on the shaft 16 and an internal shoulder 28 formed on the interior of the hub 30 of the wheel 10. The second bearing 26 is retained in place between another internal shoulder 31 formed in the hollow hub 30 and a cap 32 which is secured on the projecting end of the hub 16 by means of screws 39—39.

The hollow hub 30 has a flange 33 integrally formed on one end thereof to which the wheel disk 10 may be secured by a plurality of bolts 34—34. These bolts 34 extend through the flange 33 and the wheel 10 and then through a cover plate 35, as shown. The plate 35 is spaced a small distance from the flange 33 and covers up a central opening 36 in the wheel disk 10. A T-fitting 37 is screwed into a threaded opening which is tapped into the center of the plate 35. Adapters 38—38 attached to the ends of flexible hoses 40—40 are screwed into the opposite ends of the cross section of the T 37.

The bearings 26 prevent all but a slight leakage or loss of vacuum between the interior of the wheel hub 30 and the exterior of the stub shaft 16. If desired, a vacuum seal 41 may be slipped over the stub shaft 16 in between one of the bearings 26 and the small end of the hub 30 as shown so as to still further seal the connection between the rotating hub 30 and the stationary shaft 16.

The wheel hub 30 has a brake drum 42 integrally formed thereon for cooperation with the shoes of a centrifugal type brake. The upper shoe of the brake is indicated at 43 in Fig. 4 while the lower shoe is indicated at 44. The lower section or half is pivotally supported or connected at one end on a pin or bolt 45 which extends through a sleeve 46 formed on the brake shoe and screws into a block 47 carried on the inside of the channel beam 8. The opposite end of the brake shoe 44 is linked or coupled to the opposing end of the upper shoe 43 by means of a bolt 48 extending through ears 50 and 51 integrally formed on the bottom and upper brake shoes, respectively. A compression spring 52 is inserted between the ears 50 and 51 so as to spread these opposing ends of the shoes apart. The swinging end of the lower brake shoe 44 is supported by a rest or shelf 53 carried on one side of an angle member 54 which forms part of the machine frame. The shelf or rest 53 is positioned so as to be engaged by the head of the bolt 48 when the brake shoes 43 and 44 are released or "off."

The end of the upper brake shoe 43 opposite from the integral ear 51 is provided with an integrally formed bracket 55 having a horizontal shelf portion 56 apertured in the middle to receive one end of a link 57 in the form of a bolt with the threaded end thereof passing through the shelf 56 and secured thereto on opposite sides by means of nuts 58—58. The bottom end of the link 57 is provided with a sleeve 60 (Fig. 3) fitting in between forks 61—61 integrally formed on the end of a lever 62. A pin 63 extends through the sleeve 60 and the forks 61 so as to interconnect these parts.

The lever 62 is pivoted or fulcrumed adjacent its inner end on a pin or bolt 64 which extends through an aperture in the lever 62 and into the block 47. A spacer sleeve 65 separates the lever 62 from the block 47 and holds it in correct alignment.

The lever 62 is pivotally connected at its outer end by means of a pin 66 to a link 67 which is pivotally connected at its upper end by means of a pin 68 to a lever 70 which is fulcrumed intermediate its ends on a pin 71 projecting from an upstanding bracket 72 supported from a plate 73 mounted on the machine frame. A pulley wheel 74 is also mounted on the pin or shaft 71 and a second pulley wheel 75 of the same size is mounted on the free end of the lever 70. It will be seen that the pulley wheel 75 is swingable with the lever 70. The pulley wheel 75 is normally biased in a downward direction by means of a tension spring 76 interconnected between a stationary support 77 on the bracket 72 and the lever 70 at a point outwardly of the pin 71. The object being handled by the machine such as insulated electrical cords passes over the pulley 74 and under the pulley 75 as shown. A pair of fixed guide pulleys 78—78 are suitably supported from the frame structure through which the electrical conductor passes before it reaches the pulley 74. Normally the electrical conductor or the object after it leaves the pulley 75 goes to a windup reel which serves to apply a tension to the cord and draw it through the labeling machine as will be described in detail hereinafter. It will be seen that the tension on the conductor lifts the pulley 75 against the tension of the spring 76 thereby depressing the link 77 and the outer end of the lever 62 so that the inner end of this lever, which is connected to the link 57, is raised thereby lifting the upper brake shoe 43. As this upper brake shoe is raised, the spring 52 separates the ears 50 and 51 and both of the brake shoes are completely separated from the brake drum 42, the connecting bolt 48 being supported and resting on the shelf 53.

Should the tension of the conductor cord or object be relieved, the tension spring 76 will lower the pulley 75 and will thereby raise the outer end of the lever 62 which results in a lowering of the link 57 so as to pull the upper brake shoe 43 down onto the brake drum 42. The lowering or closing movement of the shoe 43 is sufficient to lift the ear 51 and thereby pull up the opposing ear 50 so that both brake shoes clamp onto the brake drum 42, this clamping action being enhanced by centrifugal force. The braking action which may thus be obtained with this arrangement is such that even with a wheel 10 having a diameter of approximately three feet and rotating at a speed of forty R. P. M., the wheel is braked to a stop instantly upon the release of tension on the wire being labeled. It will be understood that other types of brakes and braking arrangements may be used which are capable of providing adequate braking action.

The insulated electrical conductor or other object being handled by the machine is normally withdrawn from a supply reel and comes into the machine on the same side as it leaves. In order to center and bring the electrical cord or other object into the machine approximately level with the bottom of the wheel 10, a loop 80 is supported on a small platform 81 carried on a post 82 erected on a bottom platform 83 connected to the frame platform 7. The conductor passes through opposing grooves formed in a bottom member 84 mounted on the shelf 81 and an upper member 85 which is yieldably pressed down on the conductor by a spring 86.

The suction for holding the non-tacky or non-sticky side of the tape or labels onto the rotatable tape holders and wrappers is supplied from a vacuum pump 87 mounted on the frame platform 7 and driven by an electric motor 88 by means of a drive belt 90. The flexible suction hose 23 is connected by an adapter 91 to the suction connection of the pump 87. Preferably, the pump is equipped with a relief valve 92 which opens if the suction drops below a minimum set value. It will be seen that the suction is transmitted through the stationary hose 23 to the hub structure of the wheel 10 where it passes through the stationary hollow stub shaft 16 and into the T fitting 37 from which the vacuum is transmitted to the tape serving units through the flexible hose connections 40. The T fitting 37 and the hose connections 40 rotate as part of the wheel assembly.

The machine has two tape serving and applicating units, which are mounted on the wheel 10 at diametrically opposed locations. In this connection, it will be understood that the machine could operate with only one tape serving and applicating unit or it could have more than two of them, the number depending upon the design of any particular machine. If there is more than one tape serving and applicating unit, it will ordinarily be desirable to have them symmetrically positioned or spaced on the rotating wheel although such a requirement is not essential. It will be further understood that while a machine may be adapted to carry two or more tape serving and applicating units, it is possible to operate such a machine by removing any number of these units so long as one is left in operation. In this connection, it will be apparent that the spacing of labels on the object pulled through the machine will depend upon the distance between the serving and applicating units.

Normally, each of the tape serving and applicating units will be of the same type and design and will serve and apply the same kind of tape or label. However, if desired, different types of serving and applicating units may be used and different kinds or types of tape or labels may be handled.

In the machine shown in Figs. 1 and 2 there are two serving and applicating units which are indicated generally by the reference numeral 92. Each of these units is mounted in a radially extending slot opening 93 formed in the wheel 10. The sides of these openings 93 are reinforced as indicated at 94—94, these reinforcements serving as guides for sliding blocks 95—95 on which the moving parts of the serving and applicating units 92 are mounted. Each of the blocks 95 is grooved along the opposite edges so as to provide flanges 99—99 which fit over the reinforcements 94, these interfitting parts being machined so that a smooth but accurate sliding action of the blocks 95 is obtained.

Figure 8:
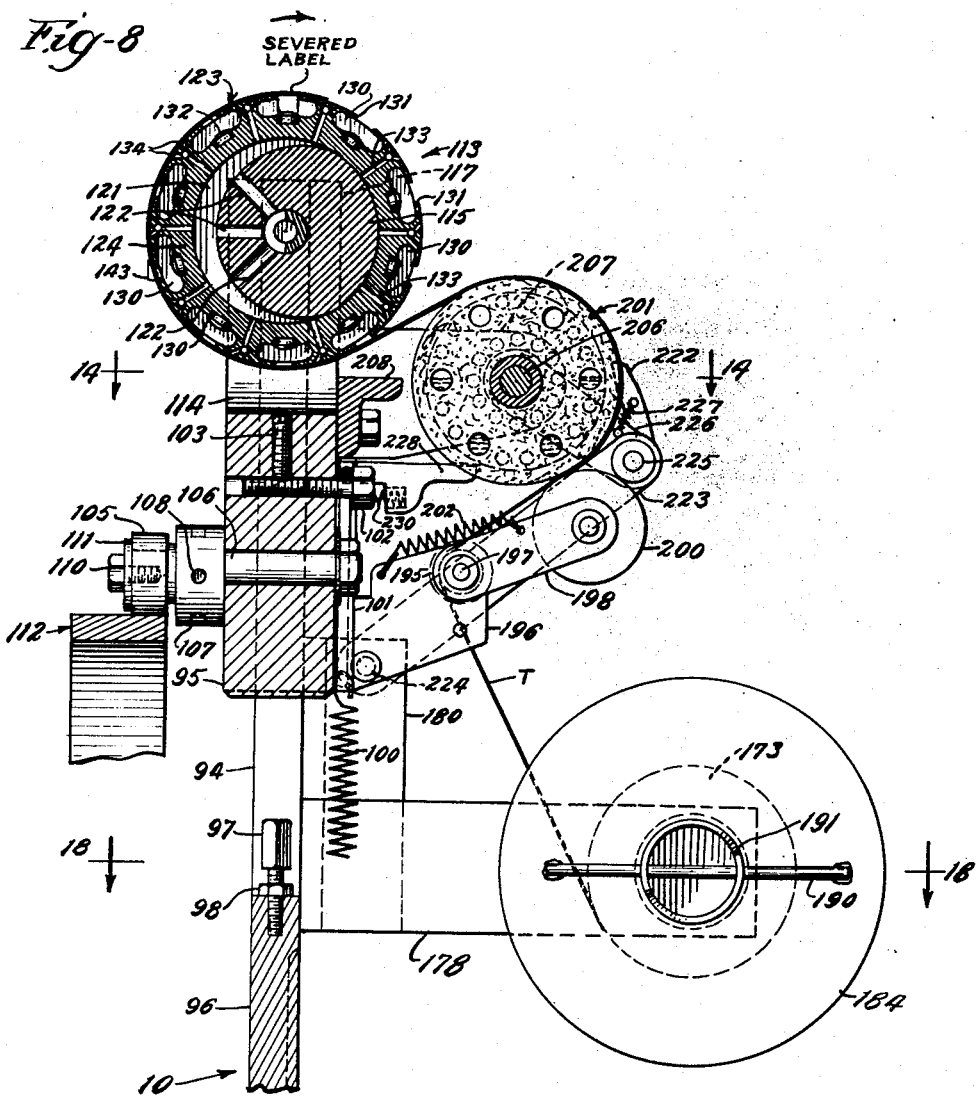
Fig. 8 is a vertical sectional view taken on line 8—8 of Fig. 5, with certain parts being shown in elevation.

At their inner ends adjacent the bases of the respective slots, each pair of the side reinforcements 94 merge into an integral portion 96 of the wheel 10 which extends inwardly to the wheel hub. In the base or bottom of each of the openings 93 a stop bolt 97 is provided which is screwed into the thickened portion 96. Each of the stop bolts 97 has a rather heavy head and is adjustably locked in place by means of a lock nut 98 (Fig. 8). The stop bolts 97 serve to arrest and limit the retraction or inward sliding movement of each block 95 when the bottom of the block strikes the bolt head.

Each of the blocks 95 is retracted or pulled inwardly toward the center of the wheel 10 by a pair of tension springs 100—100. The outer end of each spring 100 is hooked over one side of a U-shaped wire clip 101 as shown in detail in Figs. 5 and 8. Each of the wire hooks 101 is suspended at the bite from a bolt 102 (Fig. 8) which is screwed into the base of the blocks 95 and is locked in place by means of a set screw 103 as shown in Fig. 8. At their inner ends, each of the springs 100 is hooked over a pin 104 (Fig. 1) which projects from the side of the cover plate 35 of the hub structure.

Each of the sliding blocks 95 is controllably operated in opposition to the tension applied thereto by the springs 100 by a cam and cam follower mechanism. Thus, each of the sliding blocks 95 is provided with a cam follower roller 105 (Figs. 8 and 9) which is supported by a bolt 106 which extends through the block 95. Each of the bolts 106 is provided on the cam track side of the wheel 10 with an eccentric 107 which may be rotatably adjusted on the bolt 106 and secured in place thereon by means of a set screw 108. Each of the rollers 105 fits over a hub projecting from the side of the adjacent eccentric 107 and is secured thereon by means of a bolt 110 and a washer 111. This arrangement permits an accurate adjustment of each of the cam followers 105 onto a stationary cam track 112.

The cam rollers or followers 105 run on the continuous cam track indicated generally at 112, the full outline of which is shown in Fig. 2. The cam track 112 may be formed of a strip of steel and is supported on framing indicated at 109. The construction and outline of the cam track 112 will be described more fully below in connection with the mode of operation of the machine.

Each of the tape serving and applicating units 92 includes a rotatable tape holder and wrapper indicated generally at 113 which is mounted for rotation in a recess or opening 114 formed in the outer end of each one of the slide blocks 95. It will be seen that these openings 114 extend through the blocks 95 in a direction normal to the plane of the large wheel 10 and that each of the tape holders and wrappers 113 rotates about an axis which is parallel to the plane of the large wheel 10.

Each of the tape holder and wrapper devices 113 includes a stationary hub 115 which is mounted on a hollow stem or tube 116 which spans the opposite sides of the opening 114 and is supported in apertures provided therefor in the forks 117—117 as shown in Fig. 5. Each of the hollow tubes or stems 116 is provided with an adapter 118 which receives the coupling or adapter 120 fastened on the end of the suction hose 40 adjacent thereto. A set screw 119 locks each of the adapters 118 in place in the block 95. The central hole in the stem 116 does not extend completely therethrough from end to end but terminates as shown in Fig. 5. The stationary hub 115 has a "new moon" shaped suction groove 121 cut partway therearound as shown in Figs. 5 and 8. This suction groove 121 has a rectangular cross section as shown in Fig. 5 and, as viewed in Fig. 8, has a "new moon" configuration which extends somewhat over half the periphery of the hub 115. The hub 115 is also provided with three radially extending suction ports 122—122, the outer ends of which open into the suction groove or chamber 121 and the inner ends of which open into central opening in the hollow stem 116 which is cut away as shown in Fig. 8.

A rotatable ring member 123 fits over the hub 115. The ring 123 may be machined from a single piece of stock or it may be made in sections suitably locked together. The ring 123 includes an inner circumferential portion 124 which fits accurately over the hub 121 and which is locked in place thereon between a flange 125 (Fig. 5) integrally formed as part of the hub 115 and a retaining ring 126 which is secured to the hub 115 by means of three locking screws 127—127 which fit in holes which are tapped partly in the locking ring 126 and partly in the hub 115, as shown in Figs. 5 and 7. The retaining ring 126 has a wire receiving groove 128 formed therein which is aligned with the groove 15 in the periphery of the wheel 10.

A plurality of equally spaced elongated window openings 130—130 are formed in the ring 123 around the inner section 124 as shown in Figs. 5 and 8. Slot-shaped openings 131—131 are cut in the outer cylindrical face of the ring 123 so as to provide a central opening into each of the elongated window openings 130 whereby the insulated electrical conductor or other similar object being labeled by the machine may enter down into the respective elongated openings 130 as they are brought up into alignment with the groove 128. A small resilient button 132 formed of rubber or a similar material may be provided for each of the openings 130 and centrally positioned therein underneath the entry slot 131. These resilient buttons 132 provide a flexible pad support for the electrical conductor or other object as it lies in one of the window openings 130 and contributes advantages to the operation of the machine which will be referred to below.

The tape or labels being applied by the machine are supported on the outer face of the ring 123 and are held thereon by suction. Accordingly, the ring 123 is provided with radially extending suction ports 133—133 which are positioned so as to extend through the partition separating the adjacent ends of the elongated openings 130 as shown in Fig. 8. Each of the suction ports 133 branches out adjacent its outer end into branches 134—134. Sufficient space is left between the outer ends of each pair of openings 134—134 so that the tape may be severed between these openings. It will be seen that suction is communicated by each of said flexible hose connections 40 to one of the rotatable tape holders and wrappers 113 with the suction following a path which includes: the central opening in the pin 116; the suction ports 122 in the fixed hub 115; the suction chamber 121; and, the suction ports 133 in the ring 123 including the branches 134 thereof. Referring to Fig. 8 it will be noted that suction is applied through only those ports 133 which at any particular time open into the "new moon" shaped suction chamber 121. The remaining suction ports 133 in the ring 123 are temporarily closed off from the suction as they pass around that portion of the hub 115 which is not grooved.

The rotatable ring 123 is turned in a clockwise movement as viewed from Fig. 8, this rotation being in an interrupted or increment type of movement with each increment of movement being just sufficient to withdraw an additional label or predetermined length of tape and at the same time to serve up into applicating position a label or length of tape which has already been cut. This periodic advance of the ring 123 is secured through the reciprocating movement of each slide member 95 in its slideway 93. Referring to Fig. 9 it will be seen that a feeding dog 135 is provided for each tape holder and wrapper 113 which is pivoted on a pin 136 and includes a projecting finger portion 137 long enough to extend beyond the adjacent edge of the tape holder and wrapper 113 and narrow enough to fit into the slots 131. The pin 136 is carried on the side of the wheel 10 and is provided with a shoulder 137 (Fig. 12) which positions the dog 135 away from the face of the wheel. A spring 138 is compressed against the outer side of the feeder dog 135 so as to yieldably urge it against the shoulder 137. The opening 140 in the dog 135 fits over the pin 136 with a sloppy fit, thereby allowing the dog 135 not only to turn freely but also to tilt on the pin 136 without binding. The dog 135 is prevented from rotating clockwise as viewed in Fig. 9 by a stop pin 141 extending from the wheel 10 so as to engage the rear side of the vertical leg of the dog. The outer end of each spring 138 is anchored in the pin 136 while the inner end is fastened on the dog 135 so that the springs 138 continually press the dogs 135 against the stop pins 141. It will be seen that each time one of the tape serving and applicating units 92 is lowered or moved in towards the hub of the wheel 10 under control of the cam and cam follower arrangement the feeding dog 135 will rotate or advance the ring 123 by one increment. In this connection, it will be noted from Fig. 10 that the feeding dog 135 is so located that when each holder and wrapper 113 is in its outermost position the finger 137 will engage in the particular slot opening 131 which is next below the horizontal plane through the center of the holder and wrapper 113. On the opposite side of the tape holder and wrapper 113 from the feeder dog 135, a stop dog 142 is provided in order to prevent the ring 123 of the holder and wrapper 113 from reversing direction when the slide 95 on which it is supported moves outwardly to the rim of the wheel 10. The stop dog 142 is mounted on the adjacent slide 95 so that it remains in contact with the ring 123 at all times. The dog 142 has an eye 143 by which it is pivoted on a pin 144 carried on the face of the slide 95 by a bracket 145 (Fig. 13). A mousetrap spring 146 is anchored at one end to the pin 144 and the other end is fastened to the dog 142 so as to press the same against the ring 123 so that the dog can ride from one slot 131 to the next as the ring 123 is indexed.

In addition to the stop dog 142 which serves to lock the rotating ring 123 against reverse rotation each time it is indexed forwardly, another stop dog 150 is provided (Figs. 5 and 6) which is mounted on the opposite side of the wheel 10 from the side on which the feeding dog 135 and the stop dog 142 are mounted. This stop dog 150 is arranged to engage in one of the slot openings 131 in the ring 123 only when the supporting slide 95 is in, or approximately in, its outermost position. The finger of the stop dog 150 engages the trailing edge of each slot 131 which is indexed thereunder so that when the tape holder and wrapper 113 is in its outermost position, the ring 123 will be locked against reverse rotation by the dog 142 and at the same time will be locked against forward rotation by the stop dog 150. The stop dog 150 has at its rear an enlarged plate portion 151 which is supported on a block 152 by means of a bolt 149 carrying a spring 154 which is compressed between the head of the bolt and the plate 151 as shown in Fig. 6. The block is fastened on the side of the wheel 10. The hole in the portion 151 has a sloppy fit on the bolt 149 and the spring 154 allows the dog 150 to tilt outwardly from the top. The reverse or back side of the plate 151 is engaged by a flat pressure member 153 carried on the block 152 for pressing against the rear side of the dog 150. The member 153 has a hole in it which fits over a guide pin 155 carried by the block 152 and has a second hole in it through which a screw 156 extends with a spring 157 compressed between the head of the screw 156 and the bottom of the member 153 below the pin 155. This arrangement permits the plate 153 to tilt rearwardly from the top a small amount to allow for a slight lifting of the dog 150 when the adjacent holder and wrapper 113 reaches its outermost position. The springs 154 and 157 permit the locking dog 150 to lift up and tilt out so as to easily engage and then disengage from the respective slots 131 each time the adjacent tape holder and wrapper 113 is raised and lowered.

In order to wrap the projecting ends of a label or length of tape around an electrical conductor or other object after it has received the severed label from one of the rotatable tape holders and wrappers 113, provision is made to move or shift the electrical conductor or other similar object first to one side and then to the other side of the elongated window opening 130 in which the insulated conductor or other article lies. Such shifting is obtained by rocking the normally stationary hub structure 115 and retaining ring 126 which is locked thereto first to one side and then to the other, while the rotatable ring 123 is held stationary. The means for accomplishing this rocking or oscillating action of the hub structure includes a crank arm 158 having an integrally formed eye 159 on the upper end thereof by which it is pivotally connected to the face of the hub 115 by a screw 160. The bottom end of the crank arm 158 has an integrally formed eye 161 which is turned at right angles to the eye 159. A bolt 162 pivotally connects the bottom end of the crank 158 to a rocker arm 163. The rocker arm 163 is supported from the adjacent slide member 95 by means of a bracket 164 integrally formed on the adjacent slide 95. The rocker arm 163 is pivotally connected to the bracket 164 by means of a screw or bolt 165 with a compression spring 166 being compressed between the head of the bolt 165 and the face of the rocker arm 163. The spring 166 serves to press the rocker arm 163 against a spacer 169 fitting on the bolt 165 between the arm 163 and the bracket 164 so that the rocker arm 163 will not rock or turn unless it is caused to do so by the application of sufficient force to overcome the friction created by the spring 166.

A pair of leveling rollers 167 and 168 are supported on the opposite ends of the rocker arm 163, these rollers being positioned over the outer edge of the cam track 112 as shown in Fig. 11 with the bottoms of the rollers when the arm 163 is level being spaced above the bottom of the main cam follower roller 105 so that the leveling rollers 167 and 168 do not ordinarily engage the main cam track 112 unless the rocker arm 163 is tilted in one direction or the other. It will be seen from looking at Figs. 9 and 10 that when the rocker arm 163 is rocked, the crank arm 158 will rotate the normally stationary hub 115 and retaining ring 126 of the serving head in opposite directions depending upon which direction the rocker arm 163 is turned from the level position. In this level position the groove 128 in the retainer ring 126 will be positioned and accurately aligned in registration with the groove 15 in the wheel 10.

The leveling rollers 167 and 168 cooperate with leveling cams 170 and 171 and a wrapping cam 172 each of which is added to the cam track 112. The upper leveling cam 170 serves to center the notch or groove 128 just prior to the point in operation when the insulated conductor or other object being labeled leaves the wheel 10, while the lower leveling cam 171 levels the rocker arm 163 and centers the groove 128 at a point just prior to where the unlabeled electrical conductor enters the rim of the wheel 10. As will be explained in greater detail below, the wrapping cam 172 serves to rock the hub 115 and retaining ring 126 in opposite directions so as to wrap the free ends of a severed label or length of tape to the electrical conductor or other object after the tape or label has been initially applied to the conductor or other object.

The tape T (Figs. 8 and 18) which is supplied to each of the rotatable tape holders and wrappers 113 is withdrawn from a supply roll 173 which is supported on a reel indicated generally at 174 and comprising one reel part 175 having a flange 176 and provided with a central opening so as to enable it to fit over a supporting bolt 177. The bolt 177 is in turn supported on the outer end of a bracket arm 178 which is attached to the side of the slide 95 by means of an angle member 180. The bolt 177 is retained in place by a pair of nuts 181—181 which permit longitudinal shifting or adjustment of the bolt 177. The reel part 175 rotates against a positioning nut 182. This particular arrangement provides for convenient alignment and adjustment to permit tapes of various widths to be handled.

The tape roll retaining flange 176 is opposed on the opposite side of the roll tape by a removable reel member having a tape retaining flange 184 and a sleeve section 183 which fits over a sleeve section 185 integrally formed as part of the reel section 175. The bolt 177 extends into the sleeve 185 and the bolt head 186 serves to retain a compression spring 187 which presses against the reel section 175 and holds it against the positioning nut 182. The removable reel part 183 has a second flange at the other end thereof which supports a spanning bar 190 which is adapted to fit into bayonet slots 191—191 formed in the outer end of the sleeve member 185 thereby locking the reel part 183 thereon. A coil spring 192 is compressed between the flange 188 and the flange 184 thereby keeping the latter pressed against the side of the tape roll 173.

The detachable reel part is removed by pressing in on a flange 188 formed on the sleeve 183 and rotating the locking bar 190 carried thereon so as to release it from the bayonet locking slots formed in the end of the sleeve 185. The slidable flange 184 is retained from slipping off the end of the sleeve 183 by a garter clip 193. The end of the sleeve 183 and the retaining garter clip 193 are seated in a recess 194 formed in the side of the reel member 175.

The tape T passes from the reel holder over a guide roller 195 (Fig. 8) supported on a bracket 196 fastened to the side of the adjacent slide member 95. The roller 195 rotates on a supporting pin 197 projecting from the side of the bracket 196. The pin 197 also supports a swingable arm 198 on the outer end of which is supported a pressure roller 200, which presses the tape T against a feed roller indicated generally at 201. A tension spring 202 having one end attached to the arm 198 and the other attached to the bracket 196 holds the roller 200 against the tape T. The roll 201 is a soaker type roll which is used when the tape T being handled is of the water activated type and requires moistening. The roll 201 therefore comprises a hollow cylinder 203 having a hollow axle 204 extending therethrough which projects on one side of the cylinder 203 and is threaded so as to receive a nut 205. An axle 206 extends through the sleeve or housing 204 and the ends thereof project through bracket arms 207—207 integrally formed as part of a bracket 208 which is bolted to the adjacent slide 95.

The cylinder 203 is made up from two halves one of which has the stem 204 integrally formed as a part thereof. These two cylinder halves are drawn and held together by the nut 205 and have clamped therebetween a wick structure. This wick structure includes a pair of end disks 210—210 which preferably are dish-shaped. Each of the disks 210 is perforated so as to have an inner circle of holes 211—211 and an outer circle of holes comprised of large holes 212 and small holes 213. The holes permit water within the cylinder 203 to soak into the wick structure which is composed of disks 214 formed of wicking or packing material separated by screens 215—215. The disks 214 are provided with a ring of holes 216 which register with the larger holes 212 in the end disks 210 so as to form ports 217 which extend through opposite sides of the wick structure and allow the water or other liquid to flow quickly from one half to the other. Water activated tape or tape activated by any other type of liquid passes over the soaker roll or cylinder 203 with the tape guided so as to pass over the wick structure thereby moistening the tape with the liquid which is inside the cylinder. The water or other wetting liquid is introduced into the cylinder through a filling hole which is provided with a filling plug 218.

The cylinder 203 also serves to feed the tape to the associated tape holder and wrapper 113. Accordingly, one of the halves of the cylinder 203 is machined so as to form a ratchet wheel 220 on one end with the ratchet teeth being indicated at 221. The teeth 221 are engaged by a pawl 222 (Fig. 8) pivotally mounted on the outer end of a link 223 the bottom end of which is pivotally connected to the upper end of the angle bracket 180 by means of a pin 224 (Fig. 8). The pawl 222 is pivotally connected to the outer end of the link 223 by means of a pin 225 which in addition to extending through these two parts also passes through the end of an intermediate second link 226 the upper end of which is provided with an aperture so as to fit over the shaft 206. A tension spring 227 (Fig. 8) is connected to the pawl 222 and the link 226 so as to press the end of the pawl 222 against the ratchet wheel 220. Reversal of the cylinder 203 is prevented by means of a stop dog 228 pivotally mounted by a pin 229 (Fig. 5) on the slide 95 underneath the bracket 208 and pressed upwardly into the ratchet by means of a compression spring 230 (Fig. 8) one end of which fits in a recess provided in the dog 228 and the other end of which presses against the bracket 231 fastened to the slide 95 by the screws 232 as shown in Fig. 5.

It will be seen that the interconnected links 223 and 226 have a hinge action since the bottom end of the link 223 is pivoted to the stationary angle member 180 while the upper end of the link 226 is connected to the shaft 206 which moves up and down (as viewed in Fig. 8) along with the slide 95. Accordingly, as the slide 95 moves out toward the rim of the wheel 10 and the cylinder 203 moves therewith, the links 223 and 226 tend to straighten out and the end of the dog 222 passes down underneath the next succeeding ratchet notch 221. When the slot 95 retracts in toward the hub of the wheel and the links 226 and 223 tend to close, it will be seen that the dog 222 will rotate the cylinder 203 one increment and thereby withdraw the tape from the holder sufficiently to accommodate the increment in rotation of the feeding cylinder 203.

The arrangement for cutting or severing the tape into label lengths as it is held on the rotatable holders and wrappers 113 is shown in Figs. 19 and 20. A bracket 233 is welded to the inside of the channel beam 8 and a tape cutter wheel 234 is mounted on a swinging arm 235 by means of a pin 236 on which it is free to rotate. The arm 235 is supported at its upper end on a pin 237 projecting from the bracket 233. The bottom end of the arm 235 is flattened and turned at right angles to the upper end thereof and has an opening therein for receiving a guide bolt 238. This bolt is adjustable and the head 240 thereof limits the rotation of the lever 235 toward the rotating wheel 10 and the rings 123 of the tape holders and wrappers 113. A compression spring 241 is retained between the lower end of the arm 235 and the small supporting bracket 242 mounted on the side of the larger bracket 233. This spring 241 serves to yieldably compress the lower end of the arm 235 against the bolt head 240. This arrangement permits adjustment to be made from time to time so that satisfactory tape cutting and severing action will be obtained when the suction heads are carried past the cutting wheel 234 on each rotation of the large wheel 10. The cutting wheel rotates as the result of frictional engagement with the tape.

Desirably a wiper arrangement is provided for wiping adhesive from the cutting wheel 234 as it rotates. This wheel picks up a certain amount of adhesive since it cuts through the sticky side of the tape. One suitable wiper arrangement comprises an angle bracket 243 mounted on the side of the larger bracket 233 and carrying a block of felt or other wiping material 244 through which the wheel 234 rotates.

The operation

The machine is put in operation by placing the spools of tape 143 on the respective holders of the two serving and applicating units 92. The end of the tape on each spool is pulled out sufficiently so that it can be threaded over the guide roller 195, in between the pressure roller 200 and the feeding roller 201 with the sticky side of the tape running against this roller; and, then the free end of the tape is applied to the adjacent tape holder and wrapper 113. The motor 88 will already have been turned on so that the vacuum pump 87 is operating and suction is being applied to the tape holder and wrapper 113 and to each pair of the suction holes 134 in the rotating ring 123 which are served from a suction port 133 opening into the "new moon" shaped suction cavity 121. The suction applied to the openings 134 will be sufficient to hold the smooth side of the tape onto the face of the ring 123.

The insulated electrical conductor or other similar object to be labeled by the machine is withdrawn from the supply reel and threaded under and around the large wheel 10 in the groove 15 in the rim thereof and then the end is passed from the top of the wheel in between the guide rollers 78—78, over the pulley 74 and under pulley 75, and then to the wind-up reel. The machine is now ready for operation and when the wind-up reel is started and operating tension is thereby applied to the insulated conductor, the labeling machine will commence to operate. This tension operates to release the brake mechanism for the large wheel 10 so that it is free to rotate. It will be obvious that the speed of rotation of the wheel 10 will be dependent upon how fast the wind-up reel draws the conductor through the labeling machines. In one embodiment where the wheel 10 has a diameter of approximately three feet, the conductor cable being labeled can be pulled through the machine at such a rate whereat the wheel 10 rotates up to speeds of forty revolutions per minute.

Each of the two tape serving and applicating units 92 goes through one cycle of operation during each revolution of the wheel 10. The operation of one of these tape serving and applicating units 92 will be described commencing at the bottom of its circuit where the electrical conductor from the supply wheel has just passed into the groove 128 in the locking ring 126 and down into the elongated slot 130 in the rotating ring 123 which is in line with the groove 128. It will be seen that when the electrical conductor passes into these recesses it first of all engages the severed length of tape which is lying over that particular slot 130 and pulls the ends of the label off from the suction ports 134 lying on opposite sides of the slot 131 so that the ends of the tape stand up as shown in Fig. 21. As the wheel 10 continues to rotate, the next function of the machine occurs when the tape holder and wrapper 113 passes by the tape cutting wheel 234. At this time the wheel 234 severs the tape between a pair of the suction ports 134 which is located at just 90° from the conductor in the groove 128. It will be seen that in the particular construction shown there will already be one other severed piece of tape intermediate the one that is just severed and the label which is adhering to the electrical conductor as shown in Fig. 21. However, if the ring 123 had a smaller diameter there might be no intermediate label, and if the ring 123 had a larger diameter there might be several such intermediate labels. Just after the suction head passes the cutter wheel 134 the front leveling wheel 168 will engage the wrapping cam 172 added to the outer edge of the cam 112. This will cause the front end of the rocker arm 163 to rock upwardly thereby lifting the crank arm 158 and rotating the normally stationary retaining ring 126 and hub 115 in one direction so as to move the conductor into one end of the adjacent slot 130 as shown in Fig. 22. This movement wraps one of the ends of the tape around the conductor. As soon as the leading leveling roller 168 passes over the wrapping cam 172, the trailing roller 167 engages it and turns or rocks the arm 163 in a reverse direction so as to lower the crank arm 158 and rotate the retaining ring 126 with its slot 128 in a reverse direction thereby shifting the conductor to the opposite end of the groove 130 as shown in Fig. 23. This action completes the wrapping of the label around the conductor. The projections 129—129 (Figs. 21, 22 and 23) which extend over the ends of the windows 130 act as wrapping fingers in the wrapping operation. The cushion or button 132 in the groove 130 prevents slippage of the label on the conductor prior to the wrapping action.

On continued rotation of the wheel 10 the leveling roller 168 next reaches the upper leveling cam 170 which turns the rocker arm 163 to the level position and lifts the crank arm 158 from its lower position up to its intermediate position wherein the slot 128 in the retainer ring 126 is brought into registration with the center line of the adjacent elongated slot 130 in the ring 123 so that this registration and alignment will be obtained just prior to the time the labeled conductor leaves the periphery of the wheel 10 and moves out of the groove 128 and the slot 130 and passes to the take-up reel. After the serving unit 92 passes the peak position in its circuit, the main cam follower roller 105 reaches the drop-off portion of the cam which starts at 245 as indicated in Fig. 2. As the cam roller 105 passes over this drop-off, the springs 100 retract the slide 95 and the associated equipment carried thereon inwardly toward the hub of the wheel 10. As a result of this retraction or inward movement, the tape holder and wrapper 113 and the tape feeding cylinder 201 are both indexed forward one increment so as to withdraw another label length from the roll of the tape 173 and to bring the leading severed tape label into registration with the groove 128 so that it will be in position to be applied to the insulated conductor when the applicator unit 92 again reaches the bottom position wherein the insulated conductor again passes into the notch 128.

It will be understood that the cycle of operation of each of the tape serving and applicating units 92 is the same.

Obviously, there are a number of minor changes in design which may be made without departing from the principle of the invention. For example, if the machine is to handle a pressure sensitive adhesive tape instead of a water activated one, then the soaker cylinder 203 may be replaced with a wooden roller or some other roller having a surface to which the pressure sensitive adhesive does not adhere too firmly. If desired, the lower leveling cam 171 may be omitted and the machine will function properly since the rocker arm 163 is leveled by the upper leveling cam 170 and is normally retained in the leveled position by means of the spring 166 so that normally it does not move out of adjustment until the leading roller 168 carried thereby engages the wrapping cam 172. In this connection, it will be noted that the leveling rollers 167 and 168 are normally spaced away from the cam track 112 except when they engage the leveling cams 170 and 171 and the wrapping cam 172.

If desired, the wrapping cam 172 could be transposed nearer to the bottom of the cam track 112 so that the wrapping operation is performed immediately after the leading label is applied to the insulated conductor as shown in Fig. 21. If this change were made the leveling cam 170 could also be moved nearer to the bottom of the cam track or it could be left where it is.

There are other obvious modifications in design which can be made. For example, instead of having the "new moon" shaped vacuum or suction chamber 121 in the vacuum heads 113, it would be possible by the use of additional vacuum capacity to extend the vacuum chamber all the way around the hub 117, in which case some vacuum would be lost through the suction holes 134 not covered by the tape.

Another obvious modification would be to mount the large wheel 10 for rotation in a horizontal plane. The ring 123 of the tape holder and wrapper device need not have a cylindrical surface. For example, the surface may be six or eight-sided.

It will be seen from Figs. 21-23 that the tape wrapping action is obtained by relative shifting of the ring member 123 and the article shifting member, i. e. the retaining ring 126 having the notch 128. Accordingly, instead of moving the shifting member, either the ring member 123 alone can be shifted or both the ring member and the shifting member may be actuated. However, there are practical advantages in the design wherein the ring member 123 is stationary and the shifting member 126 alone is moved during the wrapping operation.

There may be instances when it is desired to use a machine so as to apply labels to an elongated article at intervals or distances exceeding the circumference of the large wheel 10. Several modifications can be used in such instances. For example, the cam track 112 may be replaced with one of spiral form so that two rotations of the wheel are required in order for the cam follower to pass over the complete length of the cam track. Such cam track and cam follower combinations are known in the art and would result in a label being applied once every two rotations of the wheel 10.

Certain objects cannot be labeled in machine shown in the drawings because they carry added elements which prevent them from running through the machine or, because they are too short. For example, Underwriters' labels cannot be applied to certain electric conductor cords until after the plugs are first attached to the ends. The tape serving and applicating units 92 can be removed from the wheel 10 and adapted to operate on a fixed mount so that these conductor cords may be manually or automatically inserted into the slot opening covered by the furtherest advanced label, separate driving means being attached to operate the serving and applicating device.

Since the above and other additional changes may be made in the foregoing construction without departing from the spirit and scope of the invention, it will be understood that the embodiment of the invention described above and shown in the accompanying drawings is intended to be interpreted as illustrative and not in a limiting sense.

What is claimed as new is:

1. A machine for serving and applying tape labels to an elongated object drawn through the machine, comprising, a wheel of relatively large diameter having at least one tape serving and applicating unit mounted thereon which operates on rotation of said wheel to deliver a severed tape label to the periphery of said wheel upon each rotation thereof so that when an elongated object such as an insulated electrical conductor is pulled over the rim of said wheel while rotating it receives a series of severed tape labels at regularly repeated intervals.

2. A machine for serving and applying tape labels to an elongated object passed through the machine, comprising, a wheel of relatively large diameter, at least one tape serving and applicating unit, support means for each of said units whereby it is reciprocable along a radius of said wheel between an outer position adjacent the rim of said wheel and an inner position, a cam track on the side of said wheel, and a cam follower on each of said units whereby each unit is reciprocated between its outer and inner positions, each of said units operating to deliver a severed tape label to the periphery of said wheel where it is applied to an elongated object such as an insulated electrical conductor as it passes around the rim of the rotating wheel.

3. A machine for serving and applying tape labels to coilable articles and operated by drawing the article through the machine, comprising, a wheel of relatively large diameter having at least one tape serving and applicating unit mounted thereon which operates on rotation of said wheel to deliver severed tape labels to the periphery of said wheel so that when an elongated article is pulled over the rim of the wheel so as to rotate the same the severed labels are applied thereto and wrapped thereon, and a brake for said wheel having an operating mechanism actuated by the tension on the article being labeled after the labeled article leaves the machine, said brake being released so long as the coilable article is being pulled through the machine and said brake being applied when tension on the coilable article is released.

4. A rotatable tape holder and wrapper device adapted to receive one end of a length of tape and to hold the non-tacky side of the same thereon by suction while labels or portions of tape of predetermined length are successively severed therefrom and applied to a coilable article, comprising, a rotatable ring member having a tape supporting surface extending therearound which is interrupted by a plurality of regularly spaced article-receiving slot openings extending transversely thereacross and said ring member having a plurality of suction holes in said tape supporting surface through which suction may be applied to hold tape thereon, and at least one tape wrapping member cooperable with each of said slot openings in said ring member for wrapping at least one end of a tape label on an article lying in one of said slots with the tape label being held in the slot by the article.

5. A rotatable tape holder and wrapper device adapted to receive one end of a length of tape and to hold the non-tacky side of the same thereon by suction while labels or portions of tape of predetermined length are successively severed therefrom and applied to a coilable article, comprising, a rotatable ring member having a tape supporting surface extending therearound which is interrupted by a plurality of regularly spaced article-receiving slot openings extending transversely thereacross each of which opens into an elongated window opening extending through said ring member from side to side interiorly of said slot opening and having a substantially greater spread than the width of the slot opening leading thereinto, and said ring member having a plurality of suction holes in its tape supporting surface through which suction may be applied to hold tape thereon, and a shifting member cooperable with each of said window openings in said ring for shifting sidewise an article lying in one of said window openings so as to wrap at least one end of a tape label on the shifted article the label being held in the slot by the article lying therein.

6. In a rotatable tape holder and wrapper device adapted to receive one end of a length of tape and to hold the non-sticky side of the same thereon by suction while labels of predetermined length are severed therefrom and the labels applied to an elongated object such as an insulated electrical conductor, in combination, a supporting hub member and a ring member rotatable thereon, said hub having a suction chamber formed in the surface thereof in the form of a groove extending at least part way around said hub so as to be covered by said ring member with at least one suction passageway in said hub communicating with said suction chamber for applying suction thereto, said ring having a tape supporting surface extending therearound and made discontinuous by a plurality of equispaced slot openings extending transversely thereacross each of which opens into an elongated object-receiving window opening extending through said ring member from one side to the other interiorly of said slot opening and having a spread substantially greater than the width of the slot opening leading thereinto, and said ring member having generally radial passageways communicating between its tape supporting surface and said suction chamber in said hub for transmitting suction to said surface so as to hold the tape thereon.

7. In a rotatable tape holder and wrapper device adapted to receive one end of a length of tape and hold the same by suction while labels are successively severed from the end of the tape and applied to an elongated object such as an insulated electrical conductor, in combination, a supporting hub member and a mating ring member rotatable thereon, said hub having a coaxial opening extending therein from which radiates at least one suction passageway leading into a suction chamber defined between said ring and said hub and extending bandwise at least part way around said hub, said ring having a tape supporting surface extending therearound rendered discontinuous by a plurality of regularly spaced transverse slot openings therein each of which opens into a transverse elongated window opening extending through said ring member from one side to the other interiorly of said slot opening and has a spread substantially greater than the width of said associated slot opening, and said ring member having a plurality of radial passageways communicating between its tape supporting surface and said suction chamber for transmitting tape holding suction to said surface.

8. In a rotatable tape holder and wrapper device adapted to receive one end of a length of tape and hold the same by suction while labels are successively severed from the end of the tape and applied to an elongated object such as an insulated electrical conductor, in combination, a supporting hub member and a mating ring member rotatable thereon, said hub having a coaxial opening extending therein from which radiates at least one suction passageway leading into a suction chamber in the form of a groove in the surface of said hub extending approximately half-way therearound, said ring having a tape supporting surface extending therearound which is interrupted by a plurality of equispaced transverse slot openings therein each of which opens into the middle of a transverse elongated window opening extending through said ring from one side to the other interiorly of said slot opening and has a spread substantially greater than the width of said associated slot opening, and said ring member having a generally radial suction passageway located between each pair of adjacent ends of said window openings and communicating between said suction chamber and said tape holding surface.

9. The combination called for in claim 8 wherein the interrupted tape supporting surface of said ring member is cylindrical.

10. The combination called for in claim 8 wherein each of said suction passageways in said ring member is branched adjacent the outer end thereof so that each pair of branches terminates on opposite sides of the half-way line between adjacent slot openings.

11. The combination called for in claim 8 wherein said suction chamber has a "new moon" configuration when viewed from the side thereof.

12. A rotatable tape holder and wrapper device adapted to receive one end of a length of tape and hold the non-sticky side of the same thereon by suction while labels are successively cut from the end of the tape so held and applied to an elongated object such as an insulated electrical conductor, comprising, a supporting hub member, a mating ring member rotatable on said hub adapted to be operatively engaged by indexing means carried on said wheel each time said slide is retracted so as to thereby advance said ring member one label length, an object-shifting means associated with said hub member, said sub having a coaxial opening extending therein from which radiates at least one suction passageway leading into a suction chamber defined between said ring and said hub and extending bandwise at least part way around said hub, said ring having a tape supporting surface extending therearound rendered discontinuous by a plurality of regularly spaced transverse object-receiving slot openings therein each of which opens into a transverse elongated window opening extending through said ring member from one side to the other interiorly of said slot opening and has a spread substantially greater than the width of said associated slot opening, said ring member having a plurality of radial passageways communicating between its tape supporting surface and said suction chamber for transmitting tape-holding suction to said surface, said object-shifting means being normally stationary and having an object-receiving notch therein with which each of said slot openings is successively aligned as said ring member is indexed around in one direction, and said object-shifting means being shiftable to opposite sides of its normally stationary position so as to shift an object being labeled first toward one end of the adjacent window opening and then toward the other.

13. A rotatable tape holder and wrapper device adapted to receive one end of a length of tape and hold the same by suction as labels are successively severed from the end thereof and applied to an elongated object such as an insulated electrical conductor, comprising: a hub member; a ring member rotatable on said hub member; and a retaining flange fastened on said hub member for retaining said ring member thereon; said hub member having a coaxial opening therein whereby it may be rotatably supported on a supporting stem member, a suction chamber being formed in the surface of said hub member in the form of a groove extending approximately half-way therearound, at least one suction passageway communicating between said suction chamber and said coaxial opening in the hub member, and a flange on said hub member which prevents said ring member from sliding off one end of said hub; said ring member having a tape supporting surface which is interrupted by regularly spaced elongated object-receiving slot openings extending transversely thereacross each of which opens into the middle of a window opening extending through said ring member from one side to the other interiorly of said slot opening and has a spread substantially greater than the width of said associated slot opening, said ring member having a plurality of radial passageways communicating between its tape supporting surface and said suction chamber for transmitting tape-holding suction to said surface; and said retaining flange being fastened to said hub member on the opposite end thereof from said hub flange so as to hold said ring member therebetween, said retaining flange having an object-receiving notch therein which is aligned with an object-receiving notch in said hub flange, said slot openings and window openings in said ring member being indexable with said aligned object-receiving notches, and said hub member being shiftable within said ring member so as to shift said aligned notches to opposite ends of a window opening which is indexed therewith.

14. A machine for serving and applying tape labels to coilable articles and operated by drawing the coilable article through the machine, comprising, a wheel of relatively large diameter having at least one tape serving and applicating unit mounted thereon which operates on rotation of said wheel to deliver severed tape labels to the periphery of said wheel so that when an elongated article is pulled over the rim of the wheel so as to rotate the same the severed labels are applied thereto; each of said tape serving and applicating units comprising a support member mounted on said wheel so as to be reciprocable between an outer position adjacent the rim of said wheel and an inner retracted position, a rotatable tape holder and wrapper device mounted on the outer end of said slide member comprising a rotatable ring member rotatable in a plane perpendicular to the plane of said large wheel and having a tape supporting surface extending therearound which is interrupted by a plurality of regularly spaced article-receiving slot openings extending transversely thereacross each of which opens into an elongated window opening extending through said ring member from side to side interiorly of said slot opening and having a substantially greater spread than the width of the slot opening, and said ring member having a plurality of suction holes in its tape supporting surface to which suction may be applied to hold tape thereon from a common suction chamber in said tape holder and wrapper device, and an article shifting member indexable and cooperable with each of said window openings in said ring member and with the rim of said wheel for shifting an article lying in one of said window openings sidewise between opposite ends thereof so as to wrap the projecting ends of a tape label passing under an article lying in the slot, an indexing dog mounted on said wheel for successively engaging in said slot openings in said ring member each time said support member is retracted so as to index said ring member ahead one of said slot openings, a cam follower mounted on said support member for engaging with a stationary cam track mounted adjacent one side of said wheel so that the support member is reciprocated between its outer and its retracted positions once during each rotation of said wheel, a holder mounted on said support member for a roll of tape the unwound end of which is held on said rotatable tape holder and wrapper device, a rocker arm rockably mounted on said slide member and carrying cam follower means for engaging a wrapping cam mounted adjacent one side of said wheel, and a crank arm operatively interconnecting said rocker arm and said article shifting member; a tape cutter mounted so as to engage and pass across the surface of said ring member once during each rotation of said wheel so as to sever a label from the end of a piece of tape held thereon; said wheel having a suction chamber at the hub thereof and a suction conduit communicating between said wheel hub suction chamber and said common suction chamber in said tape holder and wrapper device for transmitting suction thereto.

15. In a machine for serving and applying tape labels to coilable articles at spaced intervals therealong and operated by pulling the coilable article through the machine, in combination: a wheel of relatively large diameter having a hollow hub structure to which suction may be applied from a stationary fitting and having at least one suction outlet fitting which rotates with said wheel; at least one tape serving and applicating unit mounted on said wheel comprising, a slide member mounted on said wheel so as to be slidable along a radius thereof, a rotatable tape holder and wrapper device mounted on the outer end of said slide member adapted to receive one end of a length of tape and to hold the non-sticky side of the same thereon by suction while label lengths are successively cut therefrom comprising a supporting hub member the axis of which is in the plane of said wheel, a mating ring member rotatable on said hub, an object-shifting means associated with said hub member, said hub having a coaxial opening extending therein from which radiates at least one suction passageway leading into a suction chamber defined between said ring and said hub and extending bandwise at least part way around said hub, said ring having a tape supporting surface extending therearound rendered discontinuous by a plurality of regularly spaced transverse object-receiving slot openings therein each of which opens into a transverse elongated window opening extending through said ring member from one side to the other interiorly of said slot opening and has a spread substantially greater than the width of said associated slot opening, said ring member having a plurality of radial passageways communicating between its tape supporting surface and said suction chamber for transmitting tape-holding suction to said surface, said object-shifting means being normally stationary and having an object-receiving notch therein normally aligned with the rim of said wheel and with which each of said slot openings is successively aligned as said ring member is indexed around in one direction, and said object-shifting means being shiftable to opposite sides of its normally stationary position so as to shift an object being labeled first toward one end of the adjacent window opening and then toward the other, indexing means mounted on said wheel for operative engagement with said tape holder and wrapper device each time said slide is retracted from its outer position so as to thereby advance said ring member by one of said slot openings and to index the advanced slot opening with said notch in said object shifting means, a cam follower on said slide member for operative engagement with a cam track mounted adjacent one side of said wheel so that said slide is reciprocated between its outer and its retracted positions once during each rotation of said wheel, spring means connected between said slide member and said wheel for holding said cam follower onto said cam track, a holder mounted on said slide member for a roll of tape, a tape feeder roll for withdrawing tape from said roll and feeding it to said tape holder and wrapper mounted on said slide member over which the sticky side of the tape is trained as it passes from said roll to said tape holder and wrapper device, ratchet means on said tape feeder roll, a pawl mounted on said wheel for operative engagement with said ratchet means each time said slide is retracted so as to advance said tape feeder roll an amount corresponding to one label length, a rocker arm mounted on said slide member carrying cam follower means for operatively engaging a wrapping cam mounted adjacent one side of said wheel, and a crank arm operatively interconnecting said rocker arm and said article shifting member; a tape cutter wheel mounted so as to be engaged by each of said ring members as said wheel rotates thereby cutting a label length from the end of the tape held on said ring member; and a conduit mounted on said wheel interconnecting said suction outlet of said suction chamber and said suction chamber in said rotatable tape holder and wrapper device.

16. A tape serving and applicating unit adapted to be mounted on a wheel over which a coilable article may be drawn so as to be labeled at regularly spaced intervals, comprising, a slide member adapted to be slidably mounted on a support wheel for reciprocable movement on a radius thereof, a rotatable tape holder and wrapper device mounted on the outer end of said slide member adapted to receive one end of a length of tape and to hold the non-sticky side of the same thereon by suction while label lengths are successively cut therefrom comprising a supporting hub member rotatably mounted on said slide member so that the axis thereof will lie in the plane of said wheel, a mating ring member rotatable on said hub adapted to be operatively engaged by indexing means carried on said wheel each time said slide is retracted so as to thereby advance said ring member one label length, an object-shifting means associated with said hub member, said hub having a coaxial opening extending therein from which radiates at least one suction passageway leading into a suction chamber defined between said ring and said hub and extending bandwise at least part way around said hub, said ring having a tape supporting surface extending therearound rendered discontinuous by a plurality of regularly spaced transverse object-receiving slot openings therein each of which opens into a transverse elongated window opening extending through said ring member from one side to the other interiorly of said slot opening and has a spread substantially greater than the width of said associated slot opening, said ring member having a plurality of radial passageways communicating between its tape supporting surface and said suction chamber for transmitting tape-holding suction to said surface, said object-shifting means being normally stationary and having an object-receiving notch therein normally aligned with the rim of said wheel and with which each of said slot openings is successively aligned as said ring member is indexed around in one direction, and said object-shifting means being shiftable to opposite sides of its normally stationary position so as to shift an object being labeled first toward one end of the adjacent window opening and then toward the other, a cam follower on said slide member for operative engagement with a cam track mounted adjacent one side of said wheel so that said slide is reciprocated between its outer and its retracted positions once during each rotation of said wheel, a holder mounted on said slide member for a roll of tape labels, a tape feeder roll for withdrawing tape from said roll and feeding it to said tape holder and wrapper mounted on said slide member over which the sticky side of the tape is trained as it passes from said roll to said tape holder and wrapper device, ratchet means on said tape feeder adapted to cooperate with a pawl mounted on said wheel so as to advance said tape feeder roll one label length each time said slide member is retracted, a rocker arm mounted on said slide member carrying cam follower means for operatively engaging a wrapping cam mounted adjacent one side of said wheel, and a crank arm operatively interconnecting said rocker arm and said article shifting member.

17 A machine for serving and applying tape labels to an elongated object passed through the machine, comprising, a wheel of relatively large diameter, at least one tape serving and applicating unit, support means for each of said units whereby it is reciprocable along a radius of said wheel between an inner and outer position, a cam track on the side of said wheel, and a cam follower on each of said units whereby each unit is reciprocated between its outer position and its inner position once during each rotation of the large wheel, each of said units operating to deliver a severed tape label to the periphery of said wheel upon each rotation thereof where it is applied to an elongated object such as an insulated electrical conductor as it passes around the rim of the rotating wheel.

18. A tape label applying mechanism comprising a tape holder for suctionally holding the non-sticky side of a tape label over an object-receiving slot opening therein which opens into a window opening therein the opposite ends of which underlie the opposite sides of said slot, an object-receiver having a notch therein aligned with said window opening, and means whereby said tape holder and said object-receiver are relatively shiftable so that said notch may be aligned with either of the opposite ends of said window opening or with said slot opening leading thereinto.

19. Apparatus for applying tape labels to elongated objects and wrapping the ends of the labels therearound comprising, a tape holder having a tape holding surface in which there are suction holes to which suction may be applied to hold the non-sticky side of a tape label on said surface and having an object-receiving slot opening therein which leads inwardly into an object-receiving window opening therein, the opposite ends of which underlie said surface on opposite sides of said slot opening, an object-receiver having a notch therein aligned with said window opening, and means for shifting said tape holder and said object-receiver relative to each other so that said notch is alignable with either of the opposite ends of said window opening or with said slot opening leading thereinto.

20. Apparatus for applying tape labels to elongated objects and wrapping the ends of the labels therearound comprising, a tape holder having a tape holding surface in which there are suction holes to which suction may be applied to hold the non-sticky side of a tape label on said surface and having an object-receiving slot opening therein which leads inwardly into an object-receiving window opening therein the opposite ends of which underlie said surface on opposite sides of said slot opening, an object-receiver and shifter having a notch therein, aligned with said window opening and normally aligned with said slot-opening leading thereinto, and means for shifting said object-receiver and shifter from said normal alignment so as alternately to bring said notch into alignment with opposite ends of said window opening.

21. In a method of applying tape labels from a supply roll onto an elongated article, the steps of severing a label from the end of the tape, aligning an intermediate portion of said label with said article with the sticky side of the label turned towards said article and with the label being supported from the non-sticky side and releasably retained by vacuum on opposite sides of said article and unsupported at said intermediate aligned portion, bringing said label thus supported and said article together so that the unsupported intermediate portion of said label engages said article and pulls the opposite ends of said label away from their supports thereby overcoming said vacuum retention, and wrapping the unsupported label ends around said article.

22. In a method of applying tape labels from a supply roll onto an elongated article, the step of severing a label from the end of the tape, aligning an intermediate portion of said label with said article with the sticky side of the label turned towards said article and with the label being supported on opposite sides of said article and unsupported at said intermediate aligned portion, bringing said label thus supported and said article to gether so that the unsupported portion of said label engages said article and pulls the opposite ends of said label away from their supports, pressing the aligned intermediate portion of said label against said article so as to maintain said engagement, and alternately wrapping the unsupported label ends around said article.

23. In a method of applying tape labels from a supply roll onto a continuous running elongated object, the steps of severing a label from the end of the tape, aligning an intermediate portion of said label with said article with the sticky side of the label turned towards said article and with the label being supported from the non-sticky side and releasably retained by vacuum on opposite sides of said article and unsupported at said intermediate aligned portion, bringing said label thus supported and said article together so that the unsupported intermediate portion of said label engages said article and pulls the opposite ends of said label away from their supports thereby overcoming said vacuum retention, and alternately wrapping the unsupported label ends around said article.

References Cited in the file of this patent

UNITED STATES PATENTS

| Number | Name | Date |
|---|---|---|
| 2,061,968 | Kath | Nov. 24, 1936 |
| 2,107,900 | Munro | Feb. 8, 1938 |
| 2,322,605 | Veidechia | June 22, 1943 |
| 2,402,357 | Bates | June 18, 1946 |
| 2,530,655 | Entwistle | Nov. 21, 1950 |
| 2,543,323 | Marsh | Feb. 27, 1951 |

FOREIGN PATENTS

| Number | Country | Date |
|---|---|---|
| 506,760 | Great Britain | June 5, 1939 |